(12) United States Patent
Zhang et al.

(10) Patent No.: US 12,555,872 B2
(45) Date of Patent: Feb. 17, 2026

(54) POLYIMIDE COATED SEPARATORS, POROUS POLYIMIDE COATINGS, LITHIUM BATTERIES, AND RELATED METHODS

(71) Applicant: Celgard, LLC, Charlotte, NC (US)

(72) Inventors: Zhengming Zhang, Rock Hill, SC (US); Changqing Wang Adams, Fort Mill, SC (US)

(*) Notice: Subject to any disclaimer, the term of this patent is extended or adjusted under 35 U.S.C. 154(b) by 683 days.

(21) Appl. No.: 17/419,312

(22) PCT Filed: Jan. 3, 2020

(86) PCT No.: PCT/US2020/012211
§ 371 (c)(1),
(2) Date: Jun. 29, 2021

(87) PCT Pub. No.: WO2020/142708
PCT Pub. Date: Jul. 9, 2020

(65) Prior Publication Data
US 2022/0094017 A1    Mar. 24, 2022

Related U.S. Application Data

(60) Provisional application No. 62/788,203, filed on Jan. 4, 2019.

(51) Int. Cl.
*H01M 50/491* (2021.01)
*H01G 11/52* (2013.01)
(Continued)

(52) U.S. Cl.
CPC .......... *H01M 50/491* (2021.01); *H01G 11/52* (2013.01); *H01M 10/052* (2013.01);
(Continued)

(58) Field of Classification Search
CPC ............. H01M 50/491; H01M 50/414; H01M 50/403; H01M 50/417; H01M 50/457;
(Continued)

(56) References Cited

U.S. PATENT DOCUMENTS 6,432,586 B1   8/2002   Zhang
6,602,593 B1   8/2003   Callahan et al.
(Continued)

FOREIGN PATENT DOCUMENTS

CN   104157813 A  * 11/2014  .......... H01M 50/403
CN   108355706 A  *  8/2018  ........... C07C 209/78
(Continued)

OTHER PUBLICATIONS

Kesting, Robert E., Synthetic Polymeric Membranes, A Structural Perspective, Second Edition, John Wiley & Sons, New York, N.Y., (1985), pp. 227-303.
(Continued)

*Primary Examiner* — Allison Bourke
*Assistant Examiner* — Robert Gene West
(74) *Attorney, Agent, or Firm* — J. Clinton Wimbish; Maynard Nexsen PC

(57) ABSTRACT

The instant disclosure or invention is preferably directed to a polyimide coated membrane, separator membrane, or separator for a lithium battery such as a high energy or high voltage rechargeable lithium battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature
(Continued)

performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function). Although secondary lithium battery usage may be preferred, the instant polyimide coated membrane may be used in a battery, cell, primary battery, capacitor, fuel cell, textile, filter, and/or composite, and/or as a layer or component in other applications, devices, and/or the like.

22 Claims, 2 Drawing Sheets

(51) Int. Cl.
    *H01M 10/052* (2010.01)
    *H01M 50/403* (2021.01)
    *H01M 50/414* (2021.01)
    *H01M 50/417* (2021.01)
    *H01M 50/449* (2021.01)
    *H01M 50/457* (2021.01)
    *H01M 50/489* (2021.01)

(52) U.S. Cl.
    CPC ....... *H01M 50/403* (2021.01); *H01M 50/414* (2021.01); *H01M 50/417* (2021.01); *H01M 50/449* (2021.01); *H01M 50/457* (2021.01); *H01M 50/489* (2021.01)

(58) Field of Classification Search
    CPC ............. H01M 50/449; H01M 10/052; H01M 50/489; H01G 11/52
    USPC .......................................................... 429/145
    See application file for complete search history.

(56) References Cited

U.S. PATENT DOCUMENTS

| | | | | |
|---|---|---|---|---|
| 2002/0151234 A1* | 10/2002 | Ozawa | ....................... | C08J 5/18 |
| | | | | 528/170 |
| 2007/0196638 A1* | 8/2007 | Wei | ......................... | B32B 5/32 |
| | | | | 264/41 |
| 2009/0208831 A1* | 8/2009 | Tanino | ................ | H01M 50/102 |
| | | | | 429/127 |
| 2011/0223486 A1 | 9/2011 | Zhang et al. | | |
| 2013/0273435 A1* | 10/2013 | Leitner | ............... | H01M 50/414 |
| | | | | 429/188 |
| 2014/0079980 A1* | 3/2014 | Halmo | ................ | H01M 50/409 |
| | | | | 264/138 |
| 2014/0220233 A1* | 8/2014 | Huang | ................ | H01M 50/461 |
| | | | | 427/58 |
| 2014/0251897 A1* | 9/2014 | Livingston | ........... | B01D 69/105 |
| | | | | 427/508 |
| 2016/0359157 A1* | 12/2016 | Zhang | ................. | H01M 50/491 |
| 2017/0117524 A1 | 4/2017 | Chen et al. | | |
| 2017/0301959 A1* | 10/2017 | Takahashi | ......... | H01M 10/0431 |
| 2018/0097218 A1 | 4/2018 | Komura | | |
| 2018/0175449 A1* | 6/2018 | Iriyama | ............... | H01M 50/423 |
| 2018/0244886 A1* | 8/2018 | Nukada | ................ | C08F 220/14 |
| 2020/0274128 A1* | 8/2020 | Kim | ....................... | H01M 4/131 |

FOREIGN PATENT DOCUMENTS

| | | | | |
|---|---|---|---|---|
| EP | 2169743 A1 * | 3/2010 | ........ | H01M 10/0525 |
| FR | 2996684 A1 * | 4/2014 | .......... | H01M 50/489 |
| WO | WO-2017164336 A1 * | 9/2017 | ............. | C08G 73/10 |

OTHER PUBLICATIONS

PCT IPRP dated Jun. 16, 2021; from counterpart PCT Application No. PCT/US2020/012211.
PCT Search Report dated Mar. 26, 2020; from counterpart PCT Application No. PCT/US2020/012211.
PCT Written Opinion dated Mar. 20, 2020; from counterpart PCT Application No. PCT/US2020/012211.
A Review of Electrolyte Additives for Lithium-Ion Batteries, J. of Power Sources, vol. 162, Issue 2, 2006 pp. 1379-1394.

* cited by examiner

POLYIMIDE COATED SEPARATORS, POROUS POLYIMIDE COATINGS, LITHIUM BATTERIES, AND RELATED METHODS

PRIORITY

This application is a 371 U.S. application claiming priority to PCT Application No. PCT/US2020/012211, filed Jan. 3, 2020, which claims priority to U.S. Provisional Patent Application 62/788,203, which was filed on Jan. 4, 2019 and is incorporated herein in its entirety.

DESCRIPTION

Field of the Invention

The instant disclosure or invention is preferably directed to a polyimide coated membrane, separator membrane, or separator for a lithium battery such as a high energy or high voltage rechargeable lithium battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function). Although secondary lithium battery usage may be preferred, the instant polyimide coated membrane may be used in a battery, cell, primary battery, capacitor, fuel cell, textile, filter, and/or composite, and/or as a layer or component in other applications, devices, and/or the like.

In at least selected embodiments, objects or aspects, the instant disclosure or invention is directed to a polyimide coated membrane, separator membrane, or separator for a secondary lithium battery such as a high energy or high voltage rechargeable lithium ion battery, polymer battery, or metal battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function).

A separator for a high energy or high voltage rechargeable lithium battery and a high energy or high voltage rechargeable lithium battery are disclosed herein. In accordance with at least certain embodiments, objects or aspects, the instant disclosure or invention is directed to a polyimide coated separator for a high energy or high voltage rechargeable lithium battery and the corresponding battery. The separator preferably includes a porous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional stability, to reduce shrinkage, to add high temperature performance (HTMI function), to prevent electronic shorting at temperatures above 200 deg C., and/or the like. The microporous polymeric layer may be adapted, at least, to hold liquid electrolyte, to conduct ions, and/or to block ionic flow between the anode and the cathode in the event of thermal runaway (shutdown function).

The polyimide of the polyimide coating or layer may be a polyimide, co-polyimide, soluble polyimide, solvent soluble polyimide, aqueous soluble polyimide, soluble co-polyimide, solvent soluble co-polyimide, aqueous soluble co-polyimide, and combinations, mixtures, or blends thereof.

Background of the Invention

A high energy rechargeable lithium battery may have an anode with an energy capacity of at least 372 milliampere-hours/gram (mAh/g). Such anodes may include, for example, lithium metal, lithium alloys (e.g. lithium aluminum), and mixtures of lithium metal or lithium alloys and materials such as carbon, nickel, and copper.

A high voltage rechargeable lithium battery may have a voltage of at least 4.5 V, 4.7 V, or more. Such batteries may have anodes with lithium intercalation or lithium insertion compounds.

The commercial success of certain high energy and high voltage secondary or rechargeable lithium ion batteries has been hampered by persistent cycling or safety issues or problems.

One common solution is a ceramic coated separator (CCS) as described, for example, in U.S. Pat. No. 6,432,586 hereby fully incorporated by reference herein. The difficulties associated with the use of certain CCS in selected batteries or cells may include that the ceramic particles can flake off during cell manufacture, the ceramic coating is abrasive, hard to slit, and can wear out equipment and slitter blades, the ceramic coating adds thickness, cost and complexity, and the like.

Some have proposed the use of gel electrolytes or polymer electrolytes in place of the CCS. These gel electrolytes or polymer electrolytes may not have sufficient dimensional stability (do not hold their shape) and may not have good ion conductivity. Liquid electrolyte may have 10× the conductivity of a gel electrolyte or polymer electrolyte.

Also, gel electrolytes or polymer electrolytes may not prevent dendritic shorts. Lithium dendrite growth can occur after repetitive charge-discharge cycling. While dendrite growth is a potential problem with any lithium battery, the severity of the problem is increased by use of high energy anodes (e.g. metal, metal alloy, or pure carbon intercalation anodes). When lithium dendrites grow and penetrate the separator, an internal short circuit of the battery occurs (any direct contact between anode and cathode is referred to as "electronic" shorting, and contact made by dendrites is a type of electronic shorting). Some shorting (i.e., a soft short), caused by very small dendrites, may only reduce the cycling efficiency of the battery. Other shorting, such as a hard short, may result in thermal runaway of the lithium battery, a serious safety problem for lithium rechargeable batteries.

Accordingly, there is a need to improve separators for high energy or high voltage rechargeable lithium batteries.

SUMMARY OF THE INVENTION

In accordance with at least selected embodiments of the invention or disclosure, new or improved inventive separators may address the above needs, issues or problems, and/or may provide polyimide coated membranes, separators or separator membranes adapted for use in a battery, cell, primary battery, secondary battery, high energy or high voltage rechargeable lithium battery, capacitor, fuel cell, textile, filter, and/or composite, and/or as a layer or component in other applications, devices, and/or the like.

The instant disclosure or invention is preferably directed to a polyimide coated membrane, separator membrane, or separator for a lithium battery such as a high energy or high voltage rechargeable lithium battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function). Although secondary lithium battery usage may be preferred, the instant polyimide coated membrane may be used in a battery, cell, primary battery, capacitor, fuel cell, textile, garment, filter, and/or composite, and/or as a layer or component in other applications, devices, and/or the like.

In at least selected embodiments, objects or aspects, the instant disclosure or invention is directed to a polyimide coated membrane, separator membrane, or separator for a secondary lithium battery such as a high energy or high voltage rechargeable lithium ion battery, polymer battery, or metal battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function).

The polyimide of the polyimide coating or layer may be a polyimide, co-polyimide, polyimide mixture or blend, soluble polyimide, solvent soluble polyimide, aqueous soluble polyimide, soluble co-polyimide, solvent soluble co-polyimide, aqueous soluble co-polyimide, polyamide-imide, and combinations, mixtures, or blends thereof.

A separator for a high energy or high voltage rechargeable lithium battery and a high energy or high voltage rechargeable lithium battery are disclosed herein. In accordance with at least certain embodiments, objects or aspects, the instant disclosure or invention is directed to a polyimide coated separator for a high energy or high voltage rechargeable lithium battery and the corresponding battery. The separator preferably includes a porous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional stability, to reduce shrinkage, to add high temperature performance (HTMI function), to prevent electronic shorting at temperatures above 200 deg C., and/or the like. The microporous polymeric layer may be adapted, at least, to hold liquid electrolyte, to conduct ions, and/or to block ionic flow between the anode and the cathode in the event of thermal runaway (shutdown function).

In accordance with at least certain embodiments, the instant disclosure or invention is directed to a novel or improved separator for a high energy or high voltage rechargeable lithium battery and the corresponding battery. The inventive separator includes at least one polyimide layer, treatment, material, deposition, or coating and at least one polymeric microporous base layer. The polyimide coated separator is adapted, at least, to block dendrite growth and to prevent electronic shorting. The polymeric base layer is adapted, at least, to block ionic flow between the anode and the cathode in the event of thermal runaway.

General Chemical Structure of a Polyimide:

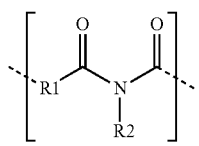

Polyimide (sometimes abbreviated PI) is a polymer of imide monomers. Polyimides have high heat-resistance. A classic polyimide is Kapton®, which is produced by condensation of pyromellitic dianhydride and 4,4'-oxydianiline. Polyimide 2D Structure:

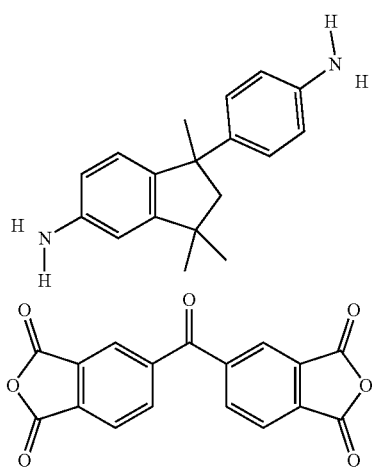

Polyamide-imides are either thermosetting or thermoplastic, amorphous polymers that have exceptional mechanical, thermal and chemical resistant properties. Polyamide-imides are prepared from isocyanates and TMA (trimellic acid-anhydride) in N-methyl-2-pyrrolidone (NMP). A prominent distributor of polyamide-imides is Solvay Specialty Polymers, which uses the trademark Torlon®.

Polyamide-imides display a combination of properties from both polyamides and polyimides, such as high strength, melt processability, exceptional high heat capability, and broad chemical resistance.

Soluble polyimides with high glass transition temperature ($T_g$) can be prepared, for example, from four commercial aromatic dianhydrides (i.e., BPDA, OPDA, 6FDA and BPADA) with a rigid aromatic diamine containing tert-butyl groups (3,3'-di-tert-butylbenzidine). Example Soluble Polyimides include: MATRIMID XU5218 commercially available from Ciba-Geigy; ULTEM 1000P commercially available from General Electric; or LaRC-CP1, LaRC-CP2, and LaRC-Si available from Imitec, Inc., Schenectady, N.Y.

Matrimid® 5218 is a soluble thermoplastic polyimide. It is fully imidized during manufacturing, eliminating the need for high temperature processing. Matrimid 5218 is soluble in a variety of common solvents. Evaporation of the solvents leaves a strong, durable, tough coating.

Nexolve CP1 fluorinated polyimide may provide superior physical and electrical properties over a wide temperature range and in a number of harsh environments. This fluorinated polyimide may be dissolved readily in a number of solvents for use in various applications including MIBK, DMF, THF, and others.

For the polyimide 1-BPDA with the rigid structure and high T g, it is still soluble in NMP, DMAc and m-cresol at 60° C. If this polyimide solution is a two-fold reduction in concentration, it could also be soluble in DMAc and m-cresol at room temperature.

Certain soluble polyimides may be dissolved in organic solvents, in which their precursor can be dissolved. Consequently, soluble polyimides can be prepared by a one-step method. Selected soluble Polyimides with Side Groups introduced into the PI backbone may be a beneficial approach to improve their solubility, because the presence of side groups can effectively prevent the coplanarity of aromatic rings and reduce the packing efficiency of their main chains.

Selected highly soluble polyimides may be synthesized from various aromatic tetracarboxylic dianhydrides and an aromatic diamine containing tert-butyl pendent groups [4,4'-methylenebis(2-tert-butylaniline)]. Such polyimides may show excellent solubility in common solvents such as chloroform, tetrahydrofuran, and dioxane at room temperature.

Certain soluble polyimides with polyalicyclic structure may be prepared by reactions of 2,3,5-tricarboxycyclopentyl acetic dianhydride (TCA-AH) with aromatic diamines (in a two-step polymerization system).

In accordance with one or more possibly preferred processes, an insoluble polyimide is converted to a soluble polyimide using one or more strong solvents, acids, or the like. Then, the soluble polyimide is mixed with a solvent and particles to form a coating slurry, the slurry is coated on the base film, then dried, then the particles are removed from the dried coating to form the preferred porous polyimide coated base film or separator.

In accordance with one or more possibly preferred processes, an insoluble polyimide is converted to a soluble polyimide using one or more strong solvents, acids, or the like. Then, the soluble polyimide is mixed with a solvent and particles to form a coating slurry, the slurry is coated on the base film, then dried, the particles may or may not be removed from the dried coating to form the polyimide coated base film or separator. For example, the particles may dissolve in the electrolyte, may absorb or adsorb electrolyte, wet with electrolyte, and/or the like.

A separator for a high energy or high voltage rechargeable lithium battery and a high energy or high voltage rechargeable lithium battery are disclosed herein. In accordance with at least certain embodiments, objects or aspects, the instant disclosure or invention is directed to a polyimide coated separator for a high energy or high voltage rechargeable lithium battery and the corresponding battery. The separator preferably includes a porous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional stability, to reduce shrinkage, to add high temperature performance (HTMI function), to prevent electronic shorting at temperatures above 200 deg C., and/or the like. The microporous polymeric layer may be adapted, at least, to hold liquid electrolyte, to conduct ions, and/or to block ionic flow between the anode and the cathode in the event of thermal runaway (shutdown function).

The polyimide of the polyimide coating or layer may be a polyimide, co-polyimide, soluble polyimide, solvent soluble polyimide, aqueous soluble polyimide, soluble co-polyimide, solvent soluble co-polyimide, aqueous soluble co-polyimide, and combinations, mixtures, or blends thereof.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

A typical lithium battery (or cell) comprises a lithium metal or alloy anode, a cathode, and a separator disposed between the anode and cathode, all of which is packaged within a can or pouch of a cylindrical cell or 'jelly roll' cell, or a prismatic or stacked cell. The invention is not limited to a particular battery or cell configuration, and may also be well suited for button cells, polymer cells, and the like. Additionally, the electrolyte may be a liquid (organic or inorganic), or a gel (or polymer). The invention will be, for convenience, described with regard to a cylindrical cell with a liquid organic electrolyte, but it is not so limited and may find use in other cell types (e.g. energy storage system, capacitor, combined cell and capacitor) and configurations.

The possibly preferred anode should have a high energy or high voltage capability or capacity, preferably greater than or equal to 372 mAh/g, preferably 700 mAh/g, and most preferably 1000 mAH/g. The preferred anode may be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode may include intercalation compounds containing lithium or insertion compounds containing lithium.

The cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable cathode polymers include, for example, polyacetylene, polypyrrole, polyaniline, and polythiophene.

The electrolyte may be liquid or gel (or polymer). Typically, the electrolyte primarily consists of a salt and a medium (e.g. in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, MN) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethylmethyl carbonate), EC/EMC/DMC/DEC, EC/EMC/DMC/DEC/PE, PC/DME, and DME/PC. Electrolyte polymer matrices may include, for example, PVDF (polyvinylidene fluoride), PVDF:THF (PVDF:tetrahydrofuran), PVDF:CTFE (PVDF: chlorotrifluoro ethylene), PVDF-HFP, PAN (polyacrylonitrile), and PEO (polyethylene oxide).

Figure 1:
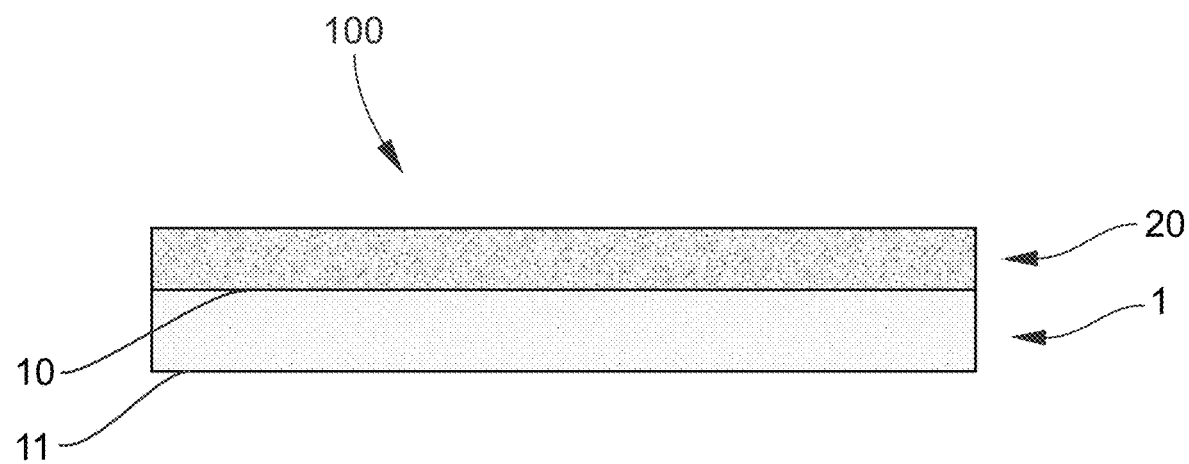
FIG. 1 is a cross-sectional view of an exemplary inventive separator 100 having a porous substrate 1 having a polyimide coating 20 on one surface 10 of the substrate 1.
Figure 2:
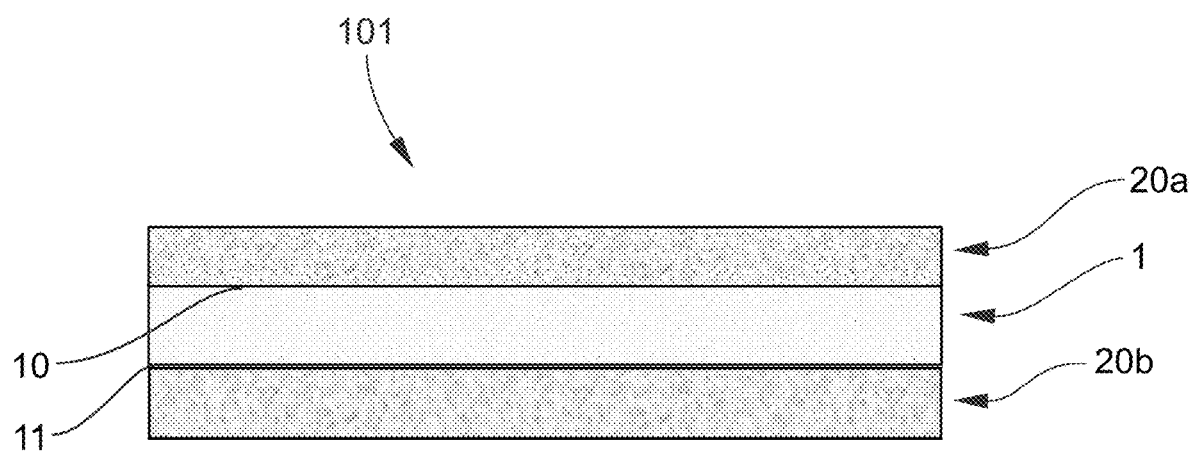
FIG. 2 is a cross-sectional view of another exemplary inventive separator 101 having a porous substrate 1 having a first polyimide coating 20a on one surface 10 of the substrate 1 and a second polyimide coating 20b on the other surface 11 of the substrate 1.

Referring to FIGS. 1 and 2, exemplary separators include at least one polyimide coating or layer on at least one side of at least one polymeric microporous layer, base film, or membrane. In the battery, the polyimide coating or layer must be sufficiently ionically conductive to allow ionic flow between the anode and cathode, so that current, in desired quantities, may be generated by the cell. The coating and base film should adhere well to one another. The coating and base film layers may be formed by lamination, coextrusion, deposition, or coating processes. The polyimide coating may be a coating or a discrete layer, either having a thickness ranging from 0.001 micron to 50 microns, preferably in the range of 0.01 micron to 15 microns or less. The polymeric microporous layer is preferably a discrete membrane having a thickness ranging from 5 microns to 50 microns, preferably in the range of 4 microns to 12 microns or more. The overall thickness of separator is in the range of 5 microns to 100 microns, preferably in the range of 6 microns to 25 microns.

The polyimide coating may be porous, microporous, or nonporous (it being understood that it is preferably porous, but that a nonporous coating layer may be ionically conductive when wet or wet out with an electrolyte dependent upon the materials making up the coating layer).

The microporous polymeric base film may be any commercially available separator microporous membranes (e.g. single ply or multi-ply), for example, the Celgard® dry process products produced by Celgard, LLC of Charlotte, North Carolina, or the Hipore® wet process products produced by Asahi Kasei Corporation of Tokyo, Japan. The base film may have a porosity in the range of 20-80%, preferably in the range of 30-60%, an average pore size in the range of 0.02 to 2 microns, preferably in the range of 0.05 to 0.5 micron, a Gurley Number in the range of 5 to 150 sec, preferably 15 to 60 sec. (Gurley Number refers to the time it takes for 10 cc of air at 12.2 inches of water to pass through one square inch of membrane), and is preferably polyolefinic. Preferred polyolefins include polyethylene and/or polypropylene. Polypropylene may be most preferred (high temp polymer, oxidation resistant).

The foregoing separator, while primarily designed for use in high energy or high voltage rechargeable lithium batteries, may be used in other battery systems in which dendrite growth may be a problem.

A base film or coating substrate can in some instances comprise a semi-crystalline polymer, such as polymers having a crystallinity in the range of 20 to 80%.

In some embodiments, a substrate described herein can comprise a single layer, a bi-layer, a tri-layer, or multilayers. For example, a tri-layer or multilayer substrate can comprise two outer layers and one or more inner layers. In some instances, a substrate can comprise 1, 2, 3, 4, 5, or more inner layers. As described in more detail below, each of the layers can be coextruded and/or laminated together.

A substrate described herein can be made by a dry stretch process (such as a Celgard® dry stretch process described herein) in which one or more polymers are extruded to form the substrate. Each of the outer and inner layers can be mono-extruded, where the layer is extruded by itself, without any sublayers (plies), or each layer can comprise a plurality of co-extruded sublayers. For example, each layer can comprise a plurality of sublayers, such as a co-extruded bi-sublayer, tri-sublayer, or multi-sublayer substrate, each of which can collectively considered to be a "layer". The number of sublayers in coextruded bi-layer is two, the number of layers in a co-extruded tri-layer is three, and the number of layers in a co-extruded multi-layer substrate will be two or more, three or more, four or more, five or more, and so on. The exact number of sublayers in a co-extruded layer is dictated by the die design and not necessarily the materials that are co-extruded to form the co-extruded layer. For example, a co-extruded bi-, tri-, or multi-sublayer substrate can be formed using the same material in each of the two, three, or four or more sublayers, and these sublayers will still be considered to be separate sublayers even though each sublayer is made of the same material.

In some embodiments, a tri-layer or multilayer substrate described herein can comprise two outer layers (such as a first outer layer and a second outer layer) and a single or plurality of inner layers. The plurality of inner layers can be mono-extruded or co-extruded layers. A lamination barrier can be formed between each of the inner layers and/or between each of the outer layers and one of the inner layers. A lamination barrier can be formed when two surfaces, such as two surfaces of different substrates or layers are laminated together using heat, pressure, or heat and pressure.

In some embodiments, a substrate described herein can have the following non-limiting constructions: PP, PE, PP/PP, PP/PE, PE/PP, PE/PE, PP/PP/PP, PP/PP/PE, PP/PE/PE. PP/PE/PP, PE/PP/PE, PE/PE/PP, PP/PP/PP/PP, PP/PE/PE/PP, PE/PP/PP/PE, PP/PE/PP/PP, PE/PE/PP/PP, PE/PP/PE/PP, PP/PE/PE/PE/PP, PE/PP/PP/PP/PE, PP/PP/PE/PP/PP, PE/PE/PP/PP/PE/PE, PP/PE/PP/PE/PP, PP/PE/PP/PP/PE/PE, PE/PP/PP/PE/PP, PP/PE/ PP/PE/PP/PE, PP/PP/PP/PE/PP/PP, PE/PE/PE/PE/PE/ PE/PE, PP/PE/PP/PE/PP/PE/PP, PE/PP/PE/PP/PE/PP/PE, PE/PP/PE/PP/PE/PE/PP, PP/PE/PE/PP/PE/PE/PP, PE/PP/PE/PE/PE/PE/PP, PP/PE/PE/PP/PE/PP/PP, PE/PP/PE/PE/PE/PE/PE, PP/PE/PP/PE/PE/PP/PE, PP/PP/PP/PE/PE/PE/PE, PP/PP/PP/PE/PP/PP/PP/PP, PE/PE/PE/PE/PP/PE/PE/PE, PP/PE/PP/PE/PP/PE/PP/ PE/PP, PE/PP/PE/PP/PE/PP/PE/PP/PE, PE/PE/PE/PE/ PP/PP/PP/PP, PP/PP/PP/PP/PE/PE/PE/PE, PP/PP/PP/ PP/PE/PE/PE/PE/PE, PE/PE/PE/PE/PP/PP/PP/PP/PP, PP/PE/PP/PE/PP/PE/PP/PE/PP, PE/PP/PE/PP/PE/ PP/PE/PP/PE, PE/PP/PP/PP/PP/PP/PP/PP/PP/PE, PP/PE/PE/PE/PE/PE/PE/PE/PE/PP, PE/PP/PP/PP/PP/PP/PP/PP/PP/PP, PP/PE/PP/PE/PP/PP/PP/PP/PE, or PE/PE/PE/PP/PP/ PE/PE/PP/PP. For purposes of reference herein PE denotes a single layer within the multilayer substrate that comprises PE. Similarly, PP denotes a single layer within the multilayer substrate that comprises PP. Thus, a PP/PE designation would represent a bi-layer substrate having a polypropylene (PP) layer and a polyethylene (PE) layer.

Individual layers in a substrate can comprise a plurality of sublayers, which can be formed by co-extrusion or combining the individual sublayers to form the individual layer of the multilayer substrate. Using a multilayer substrate having a structure of PP/PE/PP, each individual PP or PE layer can comprise two or more co-extruded sublayers. For example, when each individual PP or PE layer comprises three sublayers, each individual PP layer can be expressed as PP=(PP1, PP2,PP3) and each individual PE layer can be expressed as PE=(PE1,PE2,PE3). Thus, the structure of PP/PE/PP can be expressed as (PP1,PP2,PP3)/(PE1,PE2,PE3)/(PP1,PP2, PP3). The composition of each of the PP1, PP2, and PP3 sublayers can be the same, or each sublayer can have a different polypropylene composition than one or both of the other polypropylene sublayers. Similarly, composition of each of the PE1, PE2, and PE3 sublayers can be the same, or each sublayer can have a different polyethylene composition than one or both of the other polyethylene sublayers. This principle applies to other multilayer substrates having more or less layers that the above-described exemplary tri-layer substrate.

In some embodiments, a substrate described herein has an overall thickness of 1 micron to 60 microns, 1 micron to 55 microns, 1 micron to 50 microns, 1 micron to 45 microns, 1 micron to 40 microns, 1 micron to 35 microns, 1 micron to 30 microns, 1 micron to 25 microns, 1 micron to 20 microns, 1 micron to 15 microns, 1 micron to 10 microns, 5 microns to 50 microns, 5 microns to 40 microns, 5 microns to 30 microns, 5 microns to 25 microns, 5 microns to 20 microns, 5 microns to 10 microns, 10 microns to 40 microns, 10 microns to 35 microns, 10 microns to 30 microns, or 10 microns to 20 microns.

In some embodiments, each layer in bi-layer, tri-layer, or multi-layer substrate can have a thickness equal to a thickness of the other layers, or have a thickness that is less than or greater than a thickness of the other layers. For example, when a substrate is a tri-layer substrate comprising a structure of PP/PE/PP (polypropylene/polyethylene/polypropylene) or PE/PP/PE (polyethylene/polypropylene/polyethylene), the polypropylene layers can have a thickness equal to a thickness of the polyethylene layer(s), have a thickness less than a thickness of the polyethylene layer(s), or have a thickness greater than a thickness of the polyethylene layer(s).

In some embodiments, a substrate described herein can be a tri-layer laminated PP/PE/PP (polypropylene/polyethylene/polypropylene) or a PE/PP/PE (polyethylene/polypropylene/polyethylene) substrate. In some instances, a structure ratio of the layers of the substrate can comprise 45/10/ 45%, 40/20/40%, 39/22/39%, 38/24/38%, 37/26/37%, 36/28/36%, 35/30/35%, 34.5/31/34.5%, 34/32/34%, 33.5/ 33/33.5%, 33/34/33%, 32.5/35/32.5%, 32/36/32%, 31.5/37/ 31.5%, 31/38/31%, 30.5/39/30.5%, 30/40/30%, 29.5/41/ 29.5%, 29/42/29%, 28.5/43/28.5%, 28/44/28%, 27.5/45/ 27.5%, or 27/46/27%.

A substrate described herein can additionally comprise fillers, elastomers, wetting agents, lubricants, flame retardants, nucleating agents, antioxidants, colorants, and/or other additional elements not inconsistent with the objectives of this disclosure. For example, the substrate can comprise fillers such as calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, or combinations thereof. Elastomers can comprise ethylene-propylene (EPR), ethylene-propylene-diene (EPDM), styrene-butadiene (SBR), styrene isoprene (SIR), ethylidene norbornene (ENB), epoxy, and polyurethane or combinations thereof. Wetting agents can comprise ethoxylated alcohols, primary polymeric carboxylic acids, glycols (such as polypropylene glycol and polyethylene glycols), functionalized polyolefins, and the like. Lubricants can comprise a silicone, a fluoropolymer, oleamide, stearamide, erucamide, calcium stearate, lithium stearate, or other metallic stearates. Flame retardants can comprise brominated flame retardants, ammonium phosphate, ammonium hydroxide, alumina trihydrate, and phosphate ester. Nucleating agents can comprise any nucleating agents not inconsistent with the objectives of this disclosure, such as beta-nucleating agents for polypropylene, which is disclosed in U.S. Pat. No. 6,602,593.

A substrate described in some of the embodiments herein, can in some instances, be made by a dry-stretch process. A substrate is understood to be a thin, pliable, polymeric membrane, film, sheet, foil, or substrate having a plurality of pores extending therethrough. In some cases, the porous substrate is made by the dry-stretch process (also known as the CELGARD® dry stretch process), which refers to a process where pore formation results from stretching a nonporous, semicrystalline, extruded polymer precursor in the machine direction (MD), transverse direction (TD), or in both an MD and TD. See, for example, Kesting, Robert E., *Synthetic Polymeric Membranes, A Structural Perspective*, Second Edition, John Wiley & Sons, New York, N.Y., (1985), pages 290-297, incorporated herein by reference. Such a dry-stretch process is different from the wet process and the particle stretch process. Generally, in the wet process, also known as a phase inversion process, an extraction process, or a TIPS process, a polymeric raw material is mixed with a processing oil (sometimes referred to as a plasticizer), this mixture is extruded, and pores are formed when the processing oil is removed. While these wet process substrates may be stretched before or after the removal of the oil, the principle pore formation mechanism is the use of the processing oil. See, for example, Kesting, Ibid. pages 237-286, incorporated herein by reference. A particle stretch process uses particles, such as silica or calcium carbonate, as the pore former. The polymeric raw material is mixed with the particles, this mixture is extruded, and pores are formed when the particles are removed. While these particle filled substrates may be stretched before or after the removal of the particles, the principle pore formation mechanism is the use of the particles. A porous substrate described herein can in some instances preferably be any Celgard® polyolefin microporous separator substrate available from Celgard, LLC of Charlotte, N.C.

A porous substrate can be a macroporous substrate, a mesoporous substrate, a microporous substrate, or a nanoporous substrate. The porosity of the substrate can be any porosity not inconsistent with the goals of this disclosure. For example, any porosity that could form an acceptable battery separator is acceptable. In some embodiments, the porosity of the porous substrate is from 20 to 90%, from 20 to 80%, from 40 to 80%, from 20 to 70%, from 40 to 70%, from 40-60%, more than 20%, more than 30%, or more than 40%. Porosity is measured using ASTM D-2873 and is defined as the percentage of void space, e.g., pores, in an area of the porous substrate, measured in the Machine Direction (MD) and the Transverse Direction (TD) of the substrate. In some embodiments, the pores are slit like, are round with a sphericity factor of 0.25 to 8.0, are oblong, are trapezoidal, or are oval-shaped.

A substrate can have any Gurley not inconsistent with the objectives of this disclosure, such as a Gurley that is acceptable for use as a battery separator. Gurley is the Japanese Industrial Standard (JIS Gurley) and can be measured using a permeability tester, such as an OHKEN permeability tester. JIS Gurley is defined as the time in seconds required for 100 cc of air to pass through one square inch of substrate at a constant pressure of 4.9 inches of water. In some embodiments, the porous film or substrate described herein has a JIS Gurley (s/100cc) of 100 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 100 to 800, 200 to 700, 200 to 600, 200 to 500, 200 to 400, 200 to 300, or 300 to 600.

A substrate can have a puncture strength, uncoated, of 200 gf or more, 210 gf or more, 220 gf or more, 230 gf or more, 240 gf or more, 250 gf or more, 260 gf or more, 270 gf or more, 280 gf or more, 290 gf or more, 300 gf or more, 310 gf or more, 320 gf or more, 330 gf or more, 340 gf or more, 350 gf or more, or as high as 400 gf or more.

In some embodiments, a substrate described herein can comprise one or more additives in at least one layer of the porous substrate. In some embodiments, at least one layer of a porous substrate comprises more than one, such as two, three, four, five, or more, additives. Additives can be present in one or both of the outermost layers of the porous substrate, in one or more inner layers, in all of the inner layers, or in all of the inner and both of the outermost layers. In some embodiments, additives can be present in one or more outermost layers and in one or more innermost layers. In such embodiments, over time, an additive can be released from the outermost layer or layers and the additive supply of the outermost layer or layers can be replenished by migration of the additive in the inner layers to the outermost layers. In some embodiments, each layer of a substrate can comprise a different additive or combination of additives than an adjacent layer of the substrate.

In some embodiments, an additive comprises a functionalized polymer. As understood by one of ordinary skill in the art, a functionalized polymer is a polymer with functional groups coming off of the polymeric backbone. In some embodiments, the functionalized polymer is a maleic anhydride functionalized polymer. In some embodiments the maleic anhydride modified polymer is a maleic anhydride homo-polymer polypropylene, copolymer polypropylene, high density polypropylene, low-density polypropylene, ultra-high density polypropylene, ultra-low density polypropylene, homo-polymer polyethylene, copolymer polyethylene, high density polyethylene, low-density polyethylene, ultra-high density polyethylene, ultra-low density polyethylene, In some embodiments, an additive comprises an ionomer. An ionomer, as understood by one of ordinary skill in the art is a copolymer containing both ion-containing and non-ionic repeating groups. Sometimes the ion-containing repeating groups can make up less than 25%, less than 20%, or less than 15% of the ionomer. In some embodiments, the ionomer can be a Li-based, Na-based, or Zn-based ionomer.

In some embodiments, an additive comprises cellulose nanofiber.

In some embodiments, an additive comprises inorganic particles having a narrow size distribution. For example, the difference between D10 and D90 in a distribution is less than 100 nanometers, less than 90 nanometers, less than 80 nanometers, less than 70 nanometers, less than 60 nanometers, less than 50 nanometers, less than 40 nanometers, less than 30 nanometers, less than 20 nanometers, or less than 10 nanometers. In some embodiments, the inorganic particles are selected from at least one of $SiO_2$, $TiO_2$, or combinations thereof.

In some embodiments, an additive comprises a lubricating agent. A lubricating agent or lubricant described herein can be any lubricating agent not inconsistent with the objectives of this disclosure. As understood by one of ordinary skill in the art, a lubricant is a compound that acts to reduce the frictional force between a variety of different surfaces, including the following: polymer:polymer; polymer:metal;

polymer; organic material; and polymer:inorganic material. Specific examples of lubricating agents or lubricants as described herein are compounds comprising siloxy functional groups, including siloxanes and polysiloxanes, and fatty acid salts, including metal stearates.

Compounds comprising two or more, three or more, four or more, five or more, six or more, seven or more, eight or more, nine or more, or ten or more siloxy groups can be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, such as —CH3 or C2H5. Polysiloxanes are a polymerized siloxanes, usually having a higher molecular weight. In some embodiments described herein, the polysiloxanes can be high molecular weight, such as ultra-high molecular weight polysiloxanes. In some embodiments, high and ultra-high molecular weight polysiloxanes can have weight average molecular weights ranging from 500,000 to 1,000,000.

A fatty acid salt described herein can be any fatty acid salt not inconsistent with the objectives of this disclosure. In some instances, a fatty acid salt can be any fatty acid salt that acts as a lubricant. The fatty acid of the fatty acid salt can be a fatty acid having between 12 to 22 carbon atoms. For example, the metal fatty acid can be selected from the group consisting of: Lauric acid, myristic acid, palmitic acid, stearic acid, oleic acid, linoleic acid, linolenic acid, palmitoleic acid, behenic acid, erucic acid, and arachidic acid. The metal can be any metal not inconsistent with the objectives of this disclosure. In some instances, the metal is an alkaline or alkaline earth metal, such as Li, Be, Na, Mg, K, Ca, Rb, Sr, Cs, Ba, Fr, and Ra. In some embodiments, the metal is Li, Be, Na, Mg, K, or Ca.

A fatty acid salt can be lithium stearate, sodium stearate, lithium oleate, sodium oleate, sodium palmitate, lithium palmitate, potassium stearate, or potassium oleate.

A lubricant, including the fatty acid salts described herein, can have a melting point of 200° C. or above, 210° C. or above, 220° C. or above, 230° C. or above, or 240° C. or above. A fatty acid salt such as lithium stearate (melting point of 220° C.) or sodium stearate (melting point 245 to 255° C.) has such a melting point.

In some embodiments, an additive can comprise one or more nucleating agents. As understood by one of ordinary skill in the art, nucleating agents are, in some embodiments, materials, inorganic materials, that assist in, increase, or enhance crystallization of polymers, including semi-crystalline polymers.

In some cases, an additive can comprise a cavitation promoter. Cavitation promoters, as understood by those skilled in the art, are materials that form, assist in formation of, increase formation of, or enhance the formation of bubbles or voids in the polymer.

An additive can comprise a fluoropolymer in some instances, such as the fluoropolymers discussed in detail herein.

In some embodiments, an additive can comprise a crosslinker.

An additive described herein can in some embodiments comprise an x-ray detectable material. An x-ray detectable material can be any x-ray detectable material not inconsistent with the objectives of this disclosure, such as, for example, those disclosed in U.S. Pat. No. 7,662,510, which is incorporated by reference herein in its entirety. Suitable amounts of the x-ray detectable material or element are also disclosed in the '510 patent, but in some embodiments, up to 50 weight %, up to 40 weight %, up to 30 weight %, up to 20 weight %, up to 10 weight %, up to 5 weight %, or up to 1 weight % based on the total weight of the porous film or substrate can be used. In an embodiment, the additive is barium sulfate.

In some embodiments, an additive can comprise a lithium halide. The lithium halide can be lithium chloride, lithium fluoride, lithium bromide, or lithium iodide. The lithium halide can be lithium iodide, which is both ionically conductive and electrically insulative. In some instances, a material that is both ionically conductive and electrically insulative can be used as part of a battery separator.

In some embodiments, an additive can comprise a polymer processing agent. As understood by those skilled in the art, polymer processing agents or additives are added to improve processing efficiency and quality of polymeric compounds. In some embodiments, the polymer processing agent can be antioxidants, stabilizers, lubricants, processing aids, nucleating agents, colorants, antistatic agents, plasticizers, or fillers.

In some embodiments, an additive can comprise high temperature melt index (HTMI) polymer. The HTMI polymer can be any HTMI polymer not inconsistent with the objectives of this disclosure. In some instances, the HTMI polymer can be at least one selected from the group consisting of PMP, PMMA, PET, PVDF, Aramid, syndiotactic polystyrene, polyimide, polyamide, and combinations thereof.

An additive can optionally comprise an electrolyte. Electrolytes as described herein can be any electrolyte not inconsistent with the objectives of this disclosure. The electrolyte can be any additive typically added by battery makers, particularly lithium battery makers to improve battery performance. Electrolytes should also be capable of being combined, such as miscible, with the polymers used for the polymeric porous substrate or compatible with the coating slurry. Miscibility of the additives can also be assisted or improved by coating or partially coating the additives. For example, exemplary electrolytes are disclosed in *A Review of Electrolyte Additives for Lithium-Ion Batteries*, J. of Power Sources, vol. 162, issue 2, 2006 pp. 1379-1394, which is incorporated by reference herein in its entirety. In some embodiments, the electrolyte is at least one selected from the group consisting of a solid electrolyte interphase (SEI) improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver. In some embodiments, the electrolyte can have more than one property, such as it can be a wetting agent and a viscosity improver.

Exemplary SEI improving agents include VEC (vinyl ethylene carbonate), VC (vinylene carbonate), FEC (fluoroethylene carbonate), LiBOB (Lithium bis(oxalato) borate). Exemplary cathode protection agents include N,N'-dicyclohexylcarbodiimide, N,N-diethylamino trimethylsilane, LiBOB. Exemplary flame-retardant additives include TTFP (tris(2,2,2-trifluoroethyl)phosphate), fluorinated propylene carbonates, MFE (methyl nonafluorobuyl ether). Exemplary $LiPF_6$ salt stabilizers include LiF,TTFP (tris(2,2,2-trifluoroethyl)phosphite), 1-methyl-2-pyrrolidinone, fluorinated carbamate, hexamethyl-phosphoramide. Exemplary overcharge protectors include xylene, cyclohexylbenzene, biphenyl, 2,2-diphenylpropane, phenyl-tert-butyl carbonate. Exemplary Li deposition improvers include $AlI_3$, $SnI_2$, cetyltrimethylammonium chlorides, perfluoropolyethers, tetraalkylammonium chlorides with a long alkyl chain. Exemplary ionic salvation enhancer include 12-crown-4, TPFPB (tris(pentafluorophenyl)). Exemplary Al corrosion inhibitors include LiBOB, LiODFB, such as borate salts. Exemplary wetting agents and viscosity dilutersinclude cyclohexane and $P_2O_5$.

In some embodiments, the electrolyte additive is air stable or resistant to oxidation. A battery separator comprising the electrolyte additive disclosed herein can have a shelf life of weeks to months, e.g. one week to 11 months.

In some embodiments, an additive can comprise an energy dissipative non-miscible additive. Non-miscible means that the additive is not miscible with the polymer used to form the layer of the porous film or substrate that contains the additive.

A substrate described herein can be MD stretched or TD stretched to make the substrate porous. In some instances, the substrate is produced by sequentially performing a TD stretch of an MD stretched substrate, or by sequentially performing an MD stretch of a TD stretched substrate. In addition to a sequential MD-TD stretching (with or without relax), the substrate can also simultaneously undergo a biaxial MD-TD stretching (with or without relax). Moreover, the simultaneous or sequential MD-TD stretched porous substrate can be followed by a subsequent stretching, relaxing, heat setting, or calendering step to reduce the substrate's thickness, reduce roughness, reduce percent porosity, increase TD tensile strength, increase uniformity, and/or reduce TD splittiness.

In some embodiments, a substrate can comprise pores having an average pore size of 0.01 nm to 1 micron, 0.01 micron to 1 micron, 0.02 micron to 1 micron, 0.03 micron to 1 micron, 0.04 micron to 1 micron, 0.05 micron to 1 micron, 0.06 micron to 1 micron, 0.07 micron to 1 micron, 0.08 micron to 1 micron, 0.09 micron to 1 micron, 0.1 micron to 1 micron, 0.2 micron to 1 micron, 0.3 micron to 1 micron, 0.4 micron to 1 micron, 0.5 micron to 1 micron, 0.6 micron to 1 micron, 0.7 micron to 1 micron, 0.8 micron to 1 micron, 0.9 micron to 1 micron, 0.01 micron to 0.9 micron, 0.01 micron to 0.8 micron, 0.01 micron to 0.7 micron, 0.01 micron to 0.6 micron, 0.01 micron to 0.5 micron, 0.01 micron to 0.4 micron, 0.01 micron to 0.3 micron, 0.01 micron to 0.2 micron, 0.01 micron to 0.1 micron, 0.01 micron to 0.09 micron, 0.01 micron to 0.08 micron, 0.01 micron to 0.07 micron, 0.01 micron to 0.06 micron, 0.01 micron to 0.05 micron, 0.01 micron to 0.04 micron, 0.01 micron to 0.03 micron, 1 micron, 0.9 micron, 0.8 micron, 0.7 micron, 0.6 micron, 0.5 micron, 0.4 micron, 0.3 micron, 0.2 micron, 0.1 micron, 0.09 micron, 0.08 micron, 0.07 micron, 0.06 micron, 0.05 micron, 0.04 micron, 0.03 micron, 0.02 micron, or 0.01 micron.

In an embodiment, a porous substrate can be manufactured using an exemplary process that includes stretching and a subsequent calendering step such as a machine direction stretching followed by transverse direction stretching (with or without machine direction relax) and a subsequent calendering step as a method of reducing the thickness of such a stretched substrate, for example, a multilayer porous substrate, in a controlled manner, to reduce the percent porosity of such a stretched substrate, for example, a multilayer porous substrate, in a controlled manner, and/or to improve the strength, properties, and/or performance of such a stretched substrate, for example, a multilayer porous substrate, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched substrate, for example, a multilayer porous substrate, in a controlled manner, and/or to produce a unique structure, pore structure, material, substrate, base substrate, and/or separator.

In some instances, the TD tensile strength of the multilayer substrate can be further improved by the addition of a calendering step following TD stretching. The calendering process typically involves heat and pressure that can reduce the thickness of a porous substrate. The calendering process step can recover the loss of MD and TD tensile strength caused by TD stretching. Furthermore, the increase observed in MD and TD tensile strength with calendering can create a more balanced ratio of MD and TD tensile strength which can be beneficial to the overall mechanical performance of the multilayer substrate.

The calendering process can use uniform or non-uniform heat, pressure and/or speed to selectively densify a heat sensitive material, to provide a uniform or non-uniform calender condition (such as by use of a smooth roll, rough roll, patterned roll, micro pattern roll, nano pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like. In an embodiment, a calendering temperature of 50° C. to 70° C. and a line speed of 40 to 80 ft/min can be used, with a calendering pressure of 50 to 200 psi. The higher pressure can in some instances provide a thinner separator, and the lower pressure provide a thicker separator.

In some embodiments, a porous substrate or membrane described herein can comprise a coating positioned on the first surface, on the second surface, or on both the first and second surfaces of the porous substrate. As shown in FIG. 1 and FIG. 2. In some embodiments, the coating can comprise a first layer and a second layer. In some instances, the first layer of the coating can be positioned on the first surface of the substrate, on the second surface of the substrate, or on both the first and second surfaces of the substrate. When the first layer is positioned on the first and/or second surfaces of the substrate, the second layer of the coating can be positioned over one or both of the first layer(s) of the coating.

In some embodiments, the second layer of the coating can be positioned on the first surface of the substrate, on the second surface of the substrate, or on both the first and second surfaces of the substrate. When the second layer is positioned on the first and/or second surfaces of the substrate, the first layer of the coating can be positioned over one or both of the second layer of the coating.

In further embodiments, the first layer of the coating can be positioned on one of the first surface or second surface of the substrate, and the second layer of the coating can be positioned on the other of the first surface or second surface of the substrate. In this embodiment, the first layer on one of the surfaces of the substrate can optionally be covered with the second layer, and the second layer on the other of the surfaces of the substrate can optionally covered with the first coating, such that the first and second surfaces a have an opposite configuration of coating layers.

Further still, in other embodiments, the first layer can be positioned on both the first and second surfaces of the substrate, and only one of the two first layers on the substrate is additionally covered with a second layer of the coating. Similarly, in other instances, the second layer can be positioned on both the first and second surfaces of the substrate, and only one of the two second layers on the substrate is additionally covered with the first layer of the coating.

The first layer and the second layer can each have any thickness not inconsistent with the objectives of this disclosure. In some cases, the first layer has a thickness of 10 nm to 20 microns, 500 nm to 15 microns, 500 nm to 10 microns, 500 nm to 5 microns, or 500 nm to 1 micron The second layer can have a thickness of 500 nm to 20 microns, 500 nm to 15 microns, 500 nm to 10 microns, 500 nm to 5 microns, or 500 nm to 1 micron. The thickness of the first and second layers may be the same or different.

In another aspect, a method of preparing a coated separator described above comprises coating a first surface, an opposite facing second surface, or both the first surface and the second surface of a porous substrate with a layer, first layer and/or a second layer.

In accordance with one or more possibly preferred processes, an insoluble polyimide is converted to a soluble polyimide using one or more strong solvents, acids, or the like. Then, the soluble polyimide is mixed with a solvent and particles to form a coating slurry, the slurry is coated on the base film, then dried, then the particles are removed from the dried coating to form the preferred porous polyimide coated base film or separator.

In accordance with one or more possibly preferred processes, an insoluble polyimide is converted to a soluble polyimide using one or more strong solvents, acids, or the like. Then, the soluble polyimide is mixed with a solvent and particles (or other pore former) to form a coating slurry, the slurry is coated on the base film, then dried, then the particles (or other pore former) are optionally removed from the dried coating to form the preferred porous polyimide coated base film or separator.

In accordance with at least one embodiment, the coating (or coating slurry) and the base film or separator can be co-extruded.

In accordance with at least one embodiment, the coating or layer can be deposited or precipitated on the base film or separator such as by vapor deposition, PVD, CVD, or laser sputtering.

In accordance with one or more possibly preferred embodiments, a polyimide and/or polyamide-imide coated membrane adapted for a high energy or high voltage rechargeable lithium battery, a battery, a cell, a primary battery, a secondary battery, a capacitor, a fuel cell, a textile, a garment, a filter, and/or a composite, and/or as a layer or component in other applications, devices, and/or the like, comprising:
 a microporous base layer, membrane or film, and
 a polyimide and/or polyamide-imide coating or layer on at least one side of the microporous base layer, membrane or film, preferably a polymeric layer, more preferably a polyolefinic layer, and most preferably a dry stretch process polyolefinic layer.

In accordance with one or more possibly preferred embodiments, a polyimide and/or polyamide-imide coated membrane, comprising:
 a microporous polymeric layer, membrane or film, and
 a polyimide and/or polyamide-imide coating or layer on at least one side of the microporous polymeric layer, membrane or film.

In accordance with one or more possibly preferred embodiments, a battery, cell, primary battery, capacitor, fuel cell, textile, garment, filter, and/or composite, and/or a layer or component in other applications, devices, and/or the like, comprising or including the polyimide and/or polyamide-imide coated layer, membrane or film above.

In accordance with one or more possibly preferred embodiments, the polyimide coating or layer is at least partially covered by another coating or layer such as an adhesive or sticky coating.

In accordance with one or more possibly preferred embodiments, the separator further comprises another coating or layer on at least one side thereof such as an adhesive or sticky coating.

In accordance with one or more possibly preferred embodiments, the polyimide coating and/or adhesive or sticky coating comprises or includes a PVDF or PVDF co-polymer.

The instant disclosure or invention is preferably directed to a polyimide coated membrane, separator membrane, or separator for a lithium battery such as a high energy or high voltage rechargeable lithium battery and the corresponding battery. The separator preferably includes a porous or microporous polyimide coating or layer on at least one side of a polymeric microporous layer, membrane or film. The polyimide coating or layer may include other polymers, additives, fillers, or the like. The polyimide coating may be adapted, for example, to provide oxidation resistance, to block dendrite growth, to add dimensional and/or mechanical stability, to reduce shrinkage, to add high temperature performance (HTMI function), to prevent electronic shorting at temperatures above 200 deg C., and/or the like. The microporous polymeric base layer may be adapted, at least, to hold liquid, gel, or polymer electrolyte, to conduct ions, and/or to block ionic flow between the anode and the cathode in the event of thermal runaway (shutdown function). The polyimide coated separator may be adapted, for example, to keep the electrodes apart at high temperatures, to provide oxidation resistance, to block dendrite growth, to add dimensional stability, to reduce shrinkage, to add high temperature performance (HTMI function), to prevent electronic shorting at temperatures above 200 deg C., to increase puncture strength, and/or to block ionic flow between the anode and the cathode in the event of thermal runaway (shutdown function). Although secondary lithium battery usage may be preferred, the instant polyimide coated membrane may be used in a battery, cell, primary battery, capacitor, fuel cell, textile, filter, and/or composite, and/or as a layer or component in other applications, devices, and/or the like.

The present invention may be embodied in other specific forms without departing from the spirit or essential attributes thereof and, accordingly, reference should be made to the claims, drawings or specification, as indicating the scope of the invention.

What is claimed is:

1. A polyimide coated separator for a high energy or high voltage rechargeable lithium battery, comprising:
 a microporous polymeric layer comprising a polyolefinic membrane, and
 a microporous polyimide coating on at least one side of the microporous polymeric layer; wherein the microporous polyimide coating comprises polyimide and wherein said polyimide of the microporous polyimide coating is an aqueous soluble polyimide, wherein the aqueous soluble polyimide is synthesized from aromatic tetracarboxylic dianhydrides and [4,4'-methylen-ebis(2-tert-butylaniline)].

2. The separator according to claim 1 wherein said microporous polyimide coating is adapted to provide oxidation resistance, to block dendrite growth, to add dimensional stability, to reduce shrinkage, to add high temperature performance (HTMi function), to prevent electronic shorting at temperatures above 200 deg C., or combinations thereof.

3. The separator according to claim 1 wherein said microporous polymeric layer is adapted to hold liquid electrolyte, to conduct ions, and/or to block ionic flow between the anode and the cathode of a cell or battery in the event of thermal runaway (shutdown function).

4. The separator according to claim 1 wherein said microporous polyimide coating is made microporous by removing particles from a coating formulation of at least an acid, a polyimide and particles.

5. The separator according to claim 4, wherein said particles are selected from the group consisting of silica, calcium carbonate, sodium chloride, kaolin, barium sulfate, $SiO_2$, $Al_2O_3$, $CaCO_3$, $TiO_2$, $SiS_2$, $SiPO_4$, salt, NaCl, and/or mixtures thereof.

6. The separator according to claim 4 wherein said particles are removed with one or more solvents and the microporous polyimide coating comprises residual solvent.

7. The separator according to claim 4 wherein said microporous polyimide coating comprises residual acid.

8. The separator according to claim 1 wherein said microporous polyimide coating includes other polymers, additives, fillers or combinations thereof.

9. The separator according to claim 1 wherein said polyimide of said microporous polyimide coating is an aqueous soluble co-polyimide.

10. The separator according to claim 4 wherein before being removed said particles comprise between 20% to 80% by weight of said polyimide and particles mixture.

11. The separator according to claim 1 wherein said polyolefinic membrane is a polypropylene and/or polyethylene membrane.

12. The separator according to claim 1 wherein said polyolefinic membrane having a porosity in the range of 20-80%, an average pore size in the range of 0.02 to 1.0 microns, and a Gurley Number in the range of 5 to 300 sec.

13. The separator according to claim 4 wherein said particles have an average particle size in the range of 0.001 to 10 microns.

14. The separator according to claim 1 wherein said microporous polyimide coating is at least partially covered by another coating selected from the group consisting of an adhesive or sticky coating, wherein said polyimide coating and/or adhesive or sticky coating comprises a PVDF or PVDF copolymer.

15. The separator according to claim 1 wherein said separator further comprises another coating on at least one side thereof selected from the group consisting of an adhesive or sticky coating, wherein said microporous polyimide coating and/or adhesive or sticky coating comprises a PVDF or PVDF co-polymer.

16. The separator according to claim 1, wherein said microporous polyimide coating further comprises a PVDF or PVDF co-polymer.

17. The separator according to claim 8, wherein said microporous polyimide coating further comprises one or more additives comprising a wetting agent, lubricant, flame retardant, nucleating agent, antioxidant, colorant, or combination thereof.

18. The separator according to claim 8, wherein said microporous polyimide coating further comprises one or more fillers selected from the group of calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide, or combinations thereof.

19. The separator according to claim 17 wherein said microporous polyimide coating further comprises an additive comprising a wetting agent selected from the group of ethoxylated alcohols, primary polymeric carboxylic acids, glycols (such as polypropylene glycol and polyethylene glycols), functionalized polyolefins, and combinations thereof.

20. The separator according to claim 17 wherein said microporous polyimide coating further comprises an additive comprising a lubricant selected from the group silicone, a fluoropolymer, oleamide, stearamide, erucamide, calcium stearate, lithium stearate, or other metallic stearates.

21. The separator according to claim 17 wherein said microporous polyimide coating further comprises an additive comprising a flame retardant selected from the group of brominated flame retardants, ammonium phosphate, ammonium hydroxide, alumina trihydrate, and phosphate ester.

22. The separator according to claim 17 wherein said microporous polyimide coating further comprises an additive comprising a nucleating agent comprising a beta-nucleating agents for polypropylene.

* * * * *